May 27, 1958  F. L. GEARY ET AL  2,836,034
VARIABLE AREA NOZZLE
Original Filed June 29, 1951  2 Sheets-Sheet 1
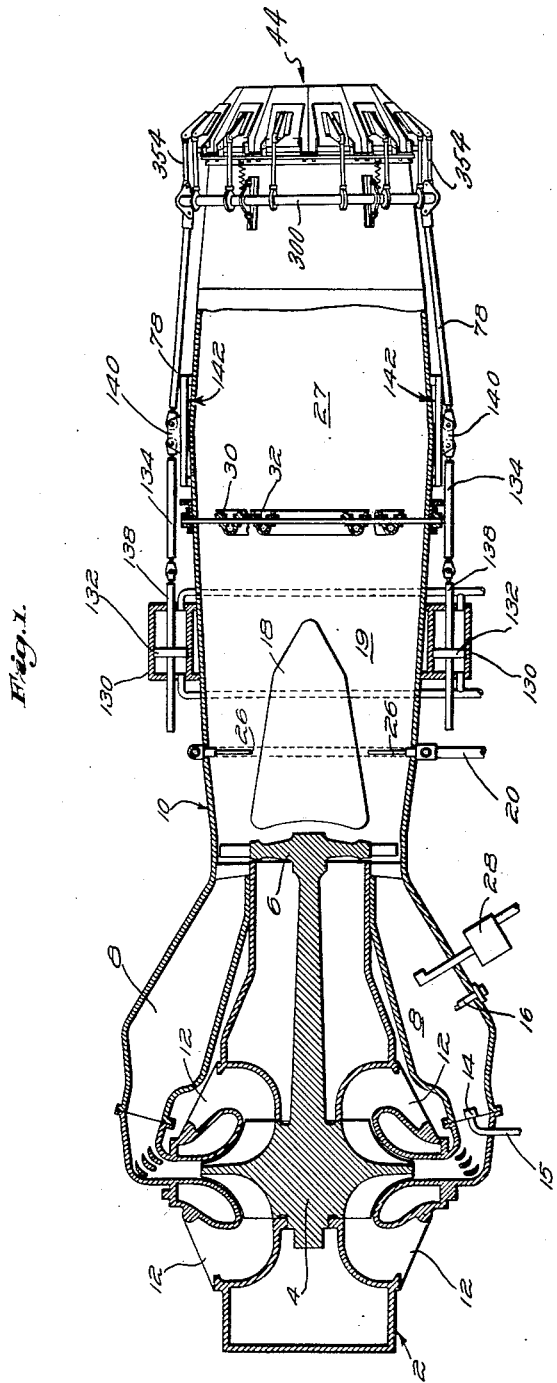
Inventors
Frederick L. Geary
William Granville Taylor Jr.
by Jack N. McCarthy
Agent

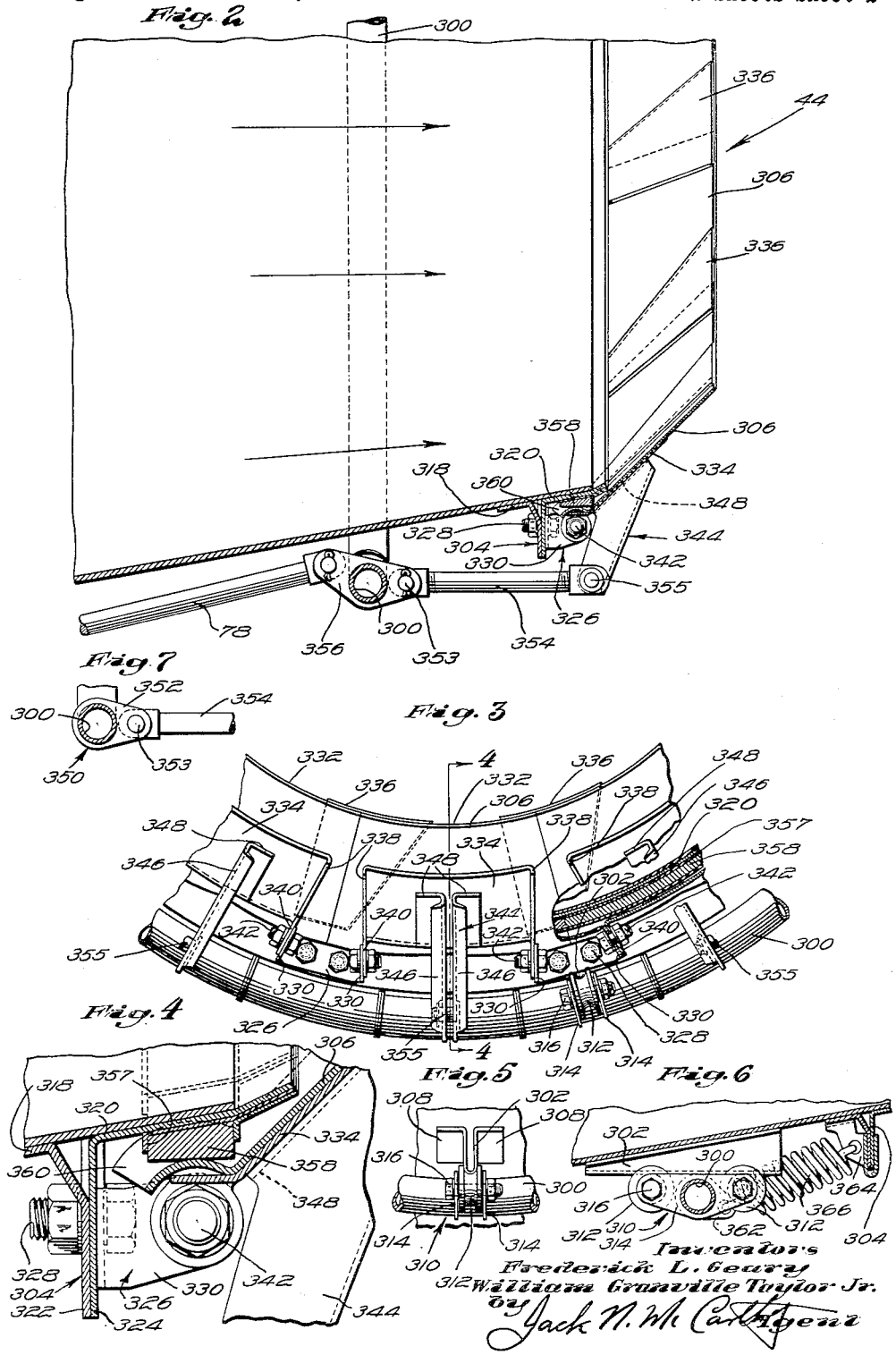

United States Patent Office 2,836,034
Patented May 27, 1958

2,836,034
VARIABLE AREA NOZZLE

Frederick L. Geary, Springfield, Mass., and William Granville Taylor, Jr., South Glastonbury, Conn., assignors to United Aircraft Corporation, East Hartford, Conn., a corporation of Delaware Original application June 29, 1951, Serial No. 234,228, now Patent No. 2,815,643, dated December 10, 1957. Divided and this application August 20, 1954, Serial No. 451,154

3 Claims. (Cl. 60—35.6)

This invention relates to a propelling nozzle for a turbojet engine and is a division of U. S. application Serial No. 234,228, filed June 29, 1951, now Patent No. 2,815,643, issued Dec. 10, 1957. Another division of the above-identified U. S. application being filed herewith is identified as U. S. application Serial No. 451,184, now Patent No. 2,811,831, issued Nov. 5, 1957.

An object of this invention is to provide a propelling nozzle of the type which can be positioned at any number of positions between two limits.

A further object is to provide a propelling nozzle which for each position of the nozzle will provide a substantially circular opening.

Another object is to provide a nozzle for a turbojet engine which can be opened and closed with a minimum load being placed on the actuating mechanism.

A further object is to provide a nozzle for an exhaust duct of a turbojet engine which for each position of the nozzle will provide an opening which is substantially in one plane perpendicular to the axis of the duct.

A further object is to provide a nozzle for an exhaust duct which has an actuating hoop guided around said exhaust duct by tracks.

Another object of this invention is to provide a nozzle for an exhaust duct having a plurality of flaps which are biased to a closed position by spring means.

Another object is to provide a nozzle having a minimum of weight.

Fig. 1 is a diagrammatic view of a turbojet engine in partial cross section with the nozzle in elevation.

Fig. 2 is an enlarged view of the propelling nozzle.

Fig. 3 is a rear view of a part of the propelling nozzle in Fig. 2 showing the arrangement of the flaps with a small portion in section.

Fig. 4 is a view taken along the line 4—4 in Fig. 3 showing the pivotal mounting of the flaps.

Fig. 5 is an end view showing a track and pulley wheel of the flap actuating mechanism shown in Fig. 2.

Fig. 6 is an elevational view of a track and pulley wheel showing the spring.

Fig. 7 is a view showing the bracket for attaching the links to the hoop.

Referring to Fig. 1, the turbojet engine 2 has a compressor 4 which in the arrangement shown is a centrifugal type driven by a turbine 6. Combustion chambers 8 therebetween deliver air from the compressor to the turbine. An afterburner 10 is attached at the turbine outlet to provide a means of increasing the thrust.

The engine 2 has two axially spaced annular intake openings 12 to direct the incoming air into the two oppositely facing annular compressor inlets. Compressed air discharged from the compressor 4 passes to the turbine through the combustion chambers 8 where it is mixed with fuel from fuel nozzles 14. These fuel nozzles 14 receive fuel through conduit 15. The fuel-air mixture is initially ignited within the combustion chambers 8 by spark igniter 16.

From the turbine, the gases pass around a cone 18 into the diffuser section 19 of the afterburner. When the afterburner is operating, fuel from a conduit 20 is discharged into these gases through a plurality of fuel nozzles 26 located in the diffuser section 19. Since the gases leaving the turbine 6 contain a considerable amount of unburned oxygen, the additional fuel introduced by fuel nozzles 26 provides a combustible mixture which may be initially ignited within combustion chamber 27 by any suitable ignition means 28. The ignition means may be of the type shown and claimed in copending application Serial No. 196,402, filed November 18, 1950, now Patent No. 2,780,055, issued February 5, 1957. The burning of this combustible mixture is stabilized in the afterburner combustion chamber 27 by flameholders 30 and 32. The burned gases discharge from the engine through the nozzle 44 whose area can be varied.

The nozzle 44 is the type which can be positioned at any number of positions between two limits. A nozzle actuating system similar to the one shown with this invention is shown and claimed in copending application Serial No. 193,734, filed November 2, 1950, now Patent No. 2,714,285, issued August 2, 1955. The actuating system consists of the cylinder 130, piston 132, connecting control rod 134, nozzle control rod 78, piston rod 138, car 140, and track mechanism 142 for said car.

Referring to Fig. 2, the nozzle shown consists of four main parts, (1) the hoop 300, (2) the hoop tracks 302, (3) the flap supporting ring 304 and (4) the flaps 306. These four parts are closely interconnected by linkages and pivots.

Referring to Figs. 2, 3, 5, 6 and 7 the hoop 300 is a circular tube located around the end of the afterburner and mounted for axial movement on tracks 302. A plurality of these tracks 302 are mounted around the afterburner. They are formed from a plate and have a single rail with flanged out parts 308 being fixed to the afterburner. For each track 302 there is a bracket 310 located on the hoop on which there are mounted two pulley wheels 312. The bracket 310 consists of two plate members 314 fixed to the hoop and extending front and rear thereof. A pulley wheel 312 is rotatably mounted on each end by a bolt 316. These wheels support the hoop 300 and permit axial movement.

The flap supporting ring 304 consists of two circular members 318 and 320 which are fixed to the end of the afterburner. Circular member 318 has a flange 322 which extends radially therefrom and circular member 320 has a similar flange 324 which extends radially therefrom. These two flanges are located adjacent each other and form a single flange projecting radially from the afterburner. Brackets 326 are bolted to said flanges 322 and 324, by bolts 328. These brackets have a boss 330 on each end, each with a hole for pivotally mounting the flaps 306 in a manner to be hereinafter described. A plurality of these brackets 326 are located around the flap supporting ring 304.

The flap itself is a plate 332 with a hinge plate 334 and sealing plate 336 fixed thereto. The hinge plate 334 is flanged up at 338 to strengthen the flap and flanged up at 340 to provide hinge points for the flap 306. These flanged portions 340 are placed between the end bosses 330 of adjacent brackets 326. A bolt 342 extends through each hole in a hinge plate and its mating hole in the boss of the bracket 326.

Each flap has an arm 344 for actuating it. These arms 344 consist of two members 346 spaced apart and fixed to the flap by flanges 348. For each flap 306 there is a connection on the hoop 300.

These connections are brackets 350 fixed to the hoop. Each bracket consists of two rearwardly extending bosses 352 fixed to said hoop and having a hole through the outer ends thereof. These brackets 350 are equally spaced around the hoop. An adjustable link 354 having a self-aligning bearing on each end extends between each bracket 350 on the hoop and the end of the arms 344 of the flap which it actuates. The ball member of the self-aligning bearing of one end of a link 354 is held between the bosses of a bracket 350 by a clevis pin 353 and the ball member of the self-aligning bearing of the other end of the link is held between the free ends of the two members of an arm 344 by a clevis pin 355. On each side of the afterburner the bracket 350 has two forwardly extending bosses 356. The end of the nozzle control rod 78 on each side of the afterburner is held between the bosses 356 located on that side.

A seal is formed between the afterburner and nozzle 44 by having a channel 357 extend around the end of the afterburner over the hinge points of the flaps 306. A sealing member 358 is placed within said channel and extends around the afterburner. The part of plate 332, forming a part of the flap 306, which is located over the hinge points is bent at 360 to mate with the sealing member 358 as the flap moves to any position.

Brackets 362 on the hoop 300 are mounted opposite brackets 364 on the flap supporting ring 304. A spring 366 is located between said brackets, one end of said spring being fixed to bracket 362 and the other end of said spring being fixed to bracket 364. This construction biases hoop 300 to the rear for a purpose to be described hereinafter.

*Operation*

Assuming the nozzle to be in the position shown in Fig. 2, when the nozzle control rods 78 are moved to the left, or front, the hoop 300 is moved in the same direction. This movement of the hoop in turn moves each link 354 to the left turning flaps 306 simultaneously by arms 344. This action is against the force of spring 366 but with the aid of the exhaust gas against the inner side of the flaps. If the nozzle is to be closed, the nozzle control rods 78 are moved to the right, or rear, and through a sequence of operation, reverse of that described above, the flaps are moved in a closing direction. It is to be noted that in closing the flaps the spring 366 is arranged so that its force aids in this movement, this is to counteract the force of the exhaust gases acting against the inner side of the flaps.

Although specific embodiments have been shown and described herein for the purpose of illustration, it will be evident to those skilled in the art that the invention is capable of various modifications and adaptations within the scope of the appended claims. Other variable area nozzles of the multiple flap type are shown and claimed in copending application Serial No. 234,256, filed June 29, 1951, now Patent No. 2,813,395, issued November 19, 1957, copending application Serial No. 284,511, filed April 26, 1952, now Patent No. 2,770,944, issued November 20, 1956, copending application Serial No. 316,911, filed October 25, 1952 and copending application Serial No. 316,912, filed October 25, 1952.

We claim:

1. A variable area nozzle including a duct having an outlet, a ring surrounding said duct adjacent to the outlet, said ring including a radially extending flange, said ring including a channel formed around the outlet of said duct having parallel radially extending flanges, a plurality of flaps pivotally mounted on said radially extending flange around said fluid outlet, each flap including a curved plate, a similarly curved hinge plate secured to one side of the flap plate, and a curved sealing plate secured to said flap plate on the opposite face thereof from said hinge plate and extending beyond one side edge of said flap plate beneath the next adjacent flap plate, a sealing member positioned in said channel, each of said flaps having a curved part adjacent its pivot engaging with said sealing member to form a seal, each flap having an arm secured to its hinge plate and projecting therefrom, means for pivoting said flaps to vary the effective area of said outlet including a hoop located around said fluid outlet, links connecting each flap arm to the hoop, tracks fixed in relation to said outlet, a wheel mounted on said hoop for engagement with each track to guide the movement of said hoop, a first bracket fixed to said hoop, a second bracket fixed to said ring, and means for biasing said hoop in a direction to restrict said nozzle area comprising a spring connected between said first and second brackets.

2. In combination, a fluid duct, said fluid duct having an open end, a ring surrounding said duct adjacent its open end, said ring including a channel formed around the duct having radially extending flanges, a sealing member being positioned in said channel and having a portion projecting beyond said flanges, a plurality of curved flaps pivotally mounted around the open end of said fluid duct, each of said flaps having a curved part engaging the projecting portion of said sealing member, each flap having two mounting flanges, said flanges being spaced apart on one side of each flap, a plurality of mounting brackets fixed to said ring, said mounting brackets being located one each between the adjacent mounting flanges of adjacent flaps, each bracket including a boss for each mounting flange, each cooperating mounting flange and boss having a pivotal attachment, each pivotal attachment being made in a plane passing through said sealing member, each flap having an arm projecting therefrom, means for pivoting said flaps to vary the effective area of said fluid duct including a hoop located around said fluid duct, links connecting each flap arm to the hoop, tracks fixed in relation to said fluid duct, and a wheel mounted on said hoop for engagement with each track to guide the movement of said hoop.

3. In combination, a fluid duct, said fluid duct having an open end, a ring surrounding said duct adjacent its open end, said ring including a channel formed around the duct having radially extending flanges, an annular sealing member positioned in said channel, a plurality of curved flaps pivotally mounted around the open end of said fluid duct, each of said flaps having a curved part adjacent its pivot engaging said annular sealing member, each flap having two mounting flanges, said flanges being spaced apart on one side of each flap, a plurality of mounting brackets fixed to said ring, said mounting brackets being located one each between the adjacent mounting flanges of adjacent flaps, each bracket including a boss for each mounting flange, each cooperating mounting flange and boss having a pivotal attachment, each pivotal attachment being made in a plane passing through said sealing member, each flap having an arm projecting therefrom radially beyond said ring, means for pivoting said flaps to vary the effective area of said fluid duct including a hoop located around said fluid duct, links connecting each flap arm to the hoop, tracks fixed in relation to said fluid duct, a wheel mounted on said hoop for engagement with each track to guide the movement of said hoop, and spring means for biasing said hoop in one direction.

References Cited in the file of this patent

UNITED STATES PATENTS

| | | |
|---|---|---|
| 2,462,953 | Eaton et al. | Mar. 1, 1949 |
| 2,488,174 | Clegern | Nov. 15, 1949 |
| 2,597,253 | Melchior | May 20, 1952 |
| 2,603,060 | Brown | July 15, 1952 |
| 2,603,062 | Weiler | July 15, 1952 |
| 2,639,578 | Pouchot | May 26, 1953 |
| 2,666,291 | Skorecki | Jan. 19, 1954 |
| 2,693,078 | Laucher | Nov. 2, 1954 |
| 2,697,907 | Gaubatz | Dec. 28, 1954 |